UNITED STATES PATENT OFFICE.

HENRY M. RAU, OF NEW YORK, N. Y.

PROCESS OF EXTRACTING TANNIC ACID.

SPECIFICATION forming part of Letters Patent No. 601,170, dated March 22, 1898.

Application filed May 28, 1897. Serial No. 638,544. (Specimens.)

*To all whom it may concern:*

Be it known that I, HENRY M. RAU, a citizen of the United States, residing at New York, in the county and State of New York, have invented new and useful Improvements in the Manufacture of Tannic Acid, of which the following is a specification.

This invention relates to the manufacture of tannic acid from sumac-leaves; and the invention consists in extracting the tannic acid, together with valueless or contaminating ingredients, such as the coloring principles, from said raw materials by acetone at low temperatures, evaporating such acetone solution or extract to dryness, and extracting the tannic acid from said dry mass by water. Such extraction by water leaves the valueless or contaminating ingredients insoluble or undissolved and separable from the tannic acid, which latter ingredient is the one desired to be obtained.

By "low temperatures" are meant temperatures not exceeding the boiling-point of acetone—that is to say, not exceeding 56.5° centigrade.

The tannic acid obtained by the process is identical in composition or chemical attributes with and is applicable to all industrial uses to which hitherto only the tannic acid prepared from nutgalls or China or Japan galls has been commercially applied.

In carrying out my process I take the powdered, ground, or crushed raw material and extract either by percolation, maceration, or by vapor extraction with acetone. Extraction takes place at ordinary temperatures of the atmosphere, except in the case of vapor extraction, in which the temperature is that at which acetone boils. I do not, however, limit myself to any specified conditions of temperature, as they may be varied without affecting the principle of my invention. The acetone takes in solution all the tannic acid and the accompanying coloring principles contained in the raw materials, together with the vegetable resins, wax, and fat present in the raw materials, and by a system of repeated extraction with the acetone either in fresh portions or with the same portion recovered by distillation the tannic acid and the other ingredients named become entirely dissolved in acetone. The substance known as "extractive matter," which is also present in the raw materials, is not dissolved by this process. By a suitable well-known arrangement of the extraction appliances the acetone may be drawn off after it has become saturated with the dissolved ingredient and is in most cases sufficiently clear to be worked up further without filtration; but if it contains any suspended undissolved materials it may first be clarified by filtration, though this is not absolutely essential. The acetone solution is now evaporated, preferably in a still, by the aid of "live" or "exhaust" steam applied by a steam-jacket or steam-coil and with recovery of the acetone as it distils off by means of a "condensing-worm." The residue remaining after all the acetone is distilled off is a resinous pasty and dark-colored mass, which by further heating becomes of such a consistency that it can be drawn off as a thick flowing paste, and it solidifies when cold, and when in a solid or dry mass it can be broken, crushed, or powdered. This mass contains all the ingredients dissolved by the acetone, and to effect from it the separation of the pure tannic acid the broken or crushed mass last described is treated with cold water either by maceration or percolation, the solvent action of the water being helped by systematic stirring or churning. Thereby the tannic acid goes into solution in the water, whereas the coloring-matter and the other ingredients from which the tannic acid is to be separated remain in the shape of an insoluble dark-colored flocculent mass, which by heating or even by mere agglomeration changes into a fatty-appearing mass. From this dark-colored insoluble mass the aqueous solution of the tannic acid is easily separated by filtration or centrifugation, and on evaporation of the water, preferably in vacuum apparatus, the tannic acid may be obtained dry and pure in the shape of a resinous-looking light-yellow or light-brown mass, clear and transparent, and which by the methods that are well known to chemists may be prepared as "flake," "needle," or simply powdered tannic acid. It is possible to get the same result by using hot water; but the extraction is no more complete than with cold water, and hot water has the disadvantage of converting the insoluble residual mass of fats, wax, and coloring principles into a fatty and smeary substance which is not as easily removed by filtering or centrifugation as when the treatment is with cold water.

What I claim as new, and desire to secure by Letters Patent, is—

The herein-described process for obtaining tannic acid, which consists in extracting tannic acid with other ingredients from sumac-leaves by acetone at low temperatures, drying or evaporating the acetone solution or extract into a dry mass, and extracting the pure tannic acid from said dry mass by water, substantially as described.

In testimony whereof I have hereunto set my hand in the presence of two subscribing witnesses.

HENRY M. RAU.

Witnesses:
WM. C. HAUFF,
E. F. KASTENHUBER.